United States Patent [19]

Uitvlugt

[11] 4,227,494
[45] Oct. 14, 1980

[54] VALVE DISABLER AND CONTROL

[75] Inventor: Martin W. Uitvlugt, Battle Creek, Mich.

[73] Assignee: Eaton Corporation, Cleveland, Ohio

[21] Appl. No.: 627,424

[22] Filed: Oct. 30, 1975

[51] Int. Cl.³ .................... F02D 13/06; F01L 1/18
[52] U.S. Cl. ...................... 123/90.16; 123/90.43; 123/198 F
[58] Field of Search .............. 123/198 F, 90.15, 90.16, 123/90.23, 90.32, 90.41, 90.43, 90.47

[56] References Cited

U.S. PATENT DOCUMENTS

| | | | |
|---|---|---|---|
| 1,797,105 | 3/1931 | Shoblom | 123/90.41 |
| 1,930,568 | 10/1933 | Short | 123/90.43 |
| 2,808,818 | 10/1957 | Sampietro | 123/90.43 |
| 2,853,984 | 9/1958 | Sampietro | 123/90.43 |
| 2,863,430 | 12/1958 | Sampietro | 123/90.43 |
| 3,009,450 | 11/1961 | Engemann | 123/90.43 |
| 3,147,745 | 9/1964 | Kilgore | 123/90.43 |
| 3,169,515 | 2/1965 | Kilgore et al. | 123/90.43 |
| 3,422,803 | 1/1969 | Stivender | 123/90.16 |
| 3,470,857 | 10/1969 | Stivender | 123/90.43 |
| 3,964,455 | 6/1976 | Brown | 123/90.16 |

Primary Examiner—Ira S. Lazarus
Attorney, Agent, or Firm—R. J. McCloskey; P. Rulon; D. Wood

[57] ABSTRACT

An improved valve disabler and disabler control for a multi-cylinder engine having individually pivoted rocker arms and an intake and exhaust valve pair for each cylinder. Each intake and exhaust valve of half of the valve pairs is associated with a selectively operable valve disabler. Each disabler includes slideable fulcrum means, a spring biasing the fulcrum into engagement with the rocker arm, a stop for limiting sliding movement of the fulcrum in the biased direction, a sleeve slideable with the fulcrum, latch means rotatable between a valve enabling position which prevents sliding movement of the sleeve and valve disabling position which allows sliding movement of the sleeve. The control includes a spring resiliently interconnecting and biasing the latches to their respective enabling position, a link pivotally connected to the latch associated with the exhaust valve and slideably and pivotally connected to the latch associated with the intake valve, and an alignment plate interconnecting a pair of disablers and providing support for retainers which prevent rotation of the sleeves and limit rotation of the latches.

29 Claims, 5 Drawing Figures

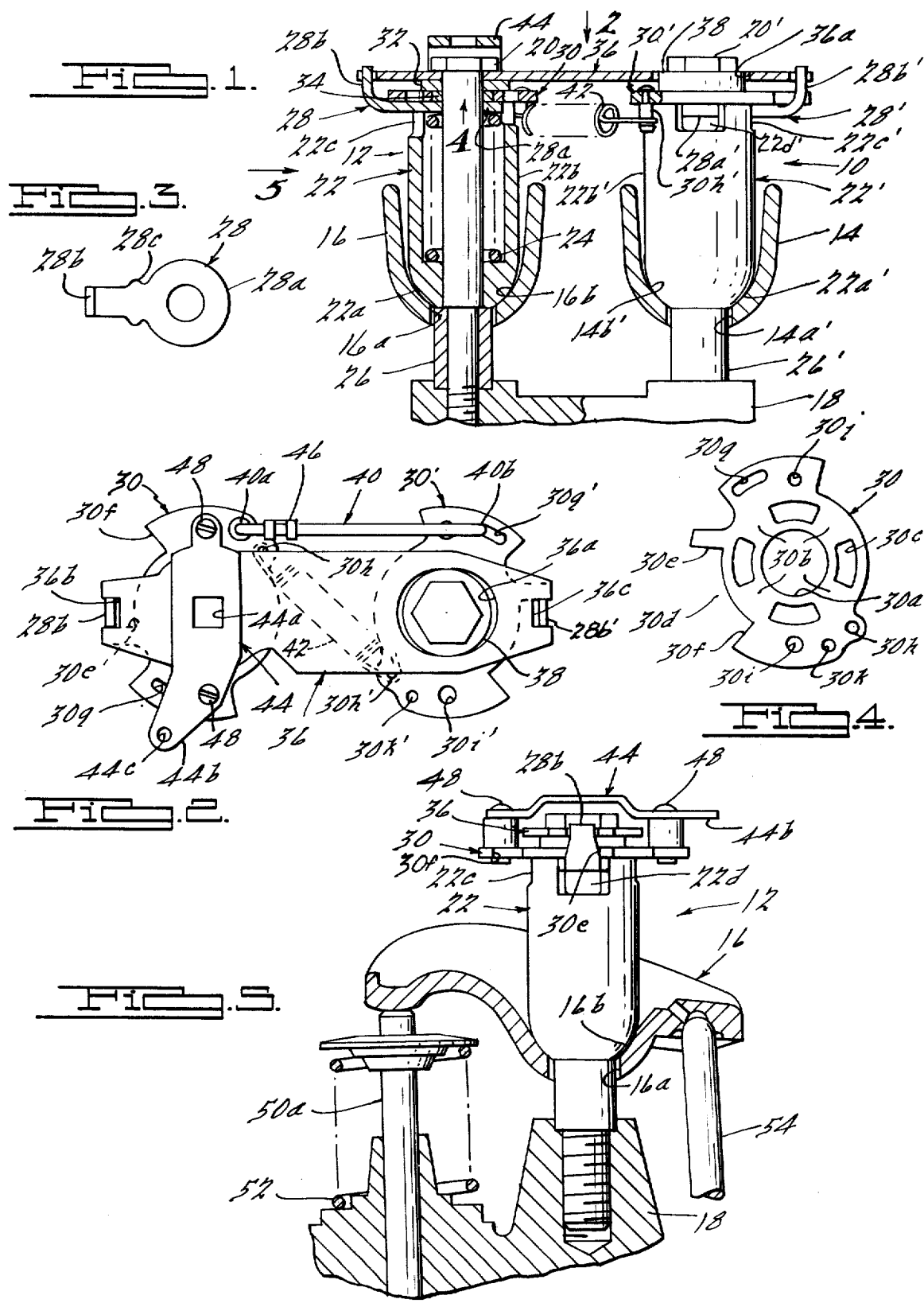

VALVE DISABLER AND CONTROL

BACKGROUND OF THE INVENTION

Cross-references

This application relates to copending applications Ser. No. 578,295, filed May 16, 1975 and 610,718, filed Sept. 5, 1975 and 610,719, filed Sept. 5, 1975 and all assigned to the assignee of this application.

1. Field of the Invention

This application relates to valve disablement and more specifically to a valve disabling mechanism and its control for deactivating selected cylinders of an internal combustion engine.

2. Description of the Prior Art

The concept of deactivating selected cylinders of an engine by disabling the valves associated with the selected cylinder is old. When this concept is applied to an Otto Cycle Engine, pumping and throttling losses are reduced, thereby improving engine efficiency during part throttle operation. U.S. patent application Ser. No. 578,295, filed May 16, 1975 discloses a valve disabler which is simple and inexpensive and which overcomes many of the disadvantages of prior art valve disablers. U.S. patent application Ser. No. 610,718 discloses an improved control for the disabler of application Ser. No. 578,295. This application discloses further improvements of the valve disablers and controls of the mentioned applications.

SUMMARY OF THE INVENTION

An object of this invention is to provide a simple, low cost, and reliable valve disabling mechanism.

Another object of this invention is to provide a valve disabling mechanism which is more compact than other such prior art mechanisms.

The valve disabler of this invention is associated with a rocker arm of a machine, such as a multi-cylinder internal combustion engine. The rocker arm is of the type that normally pivots about a fulcrum to open an associated valve. The disabler is of the type which includes the fulcrum and disablers the associated valve by allowing sliding movement of the fulcrum.

According to a feature of this invention the sleeve is slideable with the fulcrum and a latch is moveable between a valve enabling position, which prevents sliding movement of the sleeve and the fulcrum, and a valve disabling position, which allows sliding movement of the sleeve and the fulcrum.

BRIEF DESCRIPTION OF THE DRAWINGS

The preferred embodiment of the invention is shown in the accompanying drawing in which:

FIG. 1 is a partial sectional view of a pair of valve disablers;

FIG. 2 is a view of the control arrangement for the disablers, looking in the direction of arrow 2 in FIG. 1;

FIG. 3 is a detailed view of a retainer part in the disablers of FIGS. 1 and 2;

FIG. 4 is a detailed view of a rotatable latch in the disablers of FIGS. 1 and 2 and looking in the direction of arrow 4 in FIG. 1; and FIG. 5 is a side elevation view of a disabler in FIG. 1 and looking in the direction of arrow 5 in FIG. 1.

Certain terminology referring to direction and motion will be used in the following description. The terminology is for convenience in describing the preferred embodiment and should not be considered limiting unless explicitly used in the claims.

DESCRIPTION OF THE DRAWINGS

FIG. 1 illustrates in elevation a pair of valve selectors or disablers 10 and 12 which are associated with a pair of sectioned rocker arms 14 and 16. Rocker arms 14 and 16 are of conventional structure and are in turn associated, respectively, with an intake and exhaust valve pair for a cylinder of an internal combustion engine (not shown). The disablers are fixed to the engine's valve head structure which is partially shown at 18.

Disablers 10 and 12 are identical in function and substantially identical in structure. Parts of disabler 10 that are identical to corresponding parts of disabler 12 are identified with like numerals suffixed with a prime.

Disabler 12 includes a support member or bolt 20 threaded into head structure 18 and extending upward through an opening 16a in the curved pivot portion 16b of rocker arm 16, a slideable member 22 defining a fulcrum portion 22a and a sleeve portion 22b having a set of four circumferentially spaced teeth 22c at its upper end, a spring 24 biasing the fulcrum into engagement with the rocker arm pivot portion, a sleeve 26 providing a stop for limiting downward biasing movement of the fulcrum, a retainer 28 for preventing rotation of sleeve 22b, and a rotatable latch 30 sandwiched between a washer shaped portion 28a of retainer 28 and a washer 32. A washer 34, slightly thicker than latch 32, provides clearance for rotation of the latch and transmits the spring force on retainer 28 to the bolt through washer 32 and an alignment plate 36.

Fulcrum portion 22a and sleeve portion 22b of slideable member 22 may be fabricated as two parts rather than as the single part shown. Further, the curved pivot surface of the fulcrum portion may be a cylindrical section rather than the spherical section shown.

Alignment plate 36, as best seen in FIG. 2, aligns or orients the disablers and their controls with respect to each other. The plate is held against up and down movement in the plane of FIG. 1 by the head of bolt 20 and is held against rotation in the plane of FIG. 2 by a washer 38 which receives an elongated opening 36a in the plate. Washer 38 of disabler 10 has a thickness equal to the combined thickness of washer 32 and plate 36, and constitutes the only structural difference between the disablers. Opening 36a is elongated to allow for manufacturing tolerances. Plate 36 also includes slotted ends 36b and 36c which snugly receive upturned tang portions 28b and 28b' of retainer 28 and 28'.

Sleeve portion 22 includes a set of four circumferentially arrayed teeth 22c separated by spaces 22d. The circumferential width of each tooth and space is about 45 degrees.

Retainer 28, as also seen in FIG. 3, includes the washer shaped portion 28a which provides a bearing surface to restrict tilting of the upper portion of sleeve 22b, a vee shaped portion 28c which is slideably received in one of the spaces between two of the teeth 22c, and the upturned portion 28b. The depth of the space receiving vee shaped portion 28c is increased with respect to the depth of the other spaces by the thickness of the vee shaped portion.

Rotatable plates 30 and 30' are structurally identical and are positioned in their respective disablers with their like features 180 degrees apart. Plate 30, as best seen in FIG. 4 and looking upward in the direction of arrow 4 in FIG. 1, includes a central opening 30a which rotatably receives washer 32, a set of four circularly arranged abutting surfaces 30b separated by an equal number of openings 30c, an arcuate notch 30d defined by end stops 30e and 30f, a slotted arcuate opening 30g, a spring post 30h, and holes 30i, 30j, and 30k.

The control arrangement for the disabler includes a disabling link 40, a return or enabling spring 42, and a cross plate 44 for rotating latch 30 ccw to its disabling position. An end 40a of link 40 is bent and pivotally received in hole 30k and retained therein by a clip 46. The other end 40b is bent and slideably and pivotally received in arcuate slot 30g' and retained therein by an unshown clip. Slot 30g' provides a lost motion between the latches, whereby link 40 may be loaded in tension to rotate latch 30' ccw in response to ccw rotation of latch 30, but not in compression to rotate latch 30' cw in response to cw rotation of latch 30. Spring 42 biases latches 30 and 30' cw to their valve enabling positions with a force that increases in response to ccw rotation of the latch plates.

Cross plate 44 is secured to latch plate 30 by screws 48 which are received by holes 30i and 30j. The cross plate includes a square opening 44a, adapted to receive a squared end of an actuating shaft (not shown), and an extension 44b having a hole 44c. The force for rotating latches 30 and 30' ccw may be provided by any of several well known types of actuators, such as a solenoid or a vacuum motor. The force is preferably great enough to insure rapid rotation of the latches, but also low enough so that it is effective to rotate the latches only when the exhaust and intake valves associated with the disablers are inactive, i.e., the ccw force is ineffective to rotate the latches when the associated rocker arms are moving the valves. Hole 44c in extension 44b provides a means for actuating additional, identical valve disabler pairs to their disabling positions, in response to disabling actuation of the shown disabler pair. This is accomplished by connecting an unshown spring link between hole 44c and the unused arcuate slot 30g of the exhaust valve disabler of a second pair of valve disablers, etc. Such a connecting arrangement between disabler pairs reduces the number of actuators required for two or more disabler pairs.

Spring 42, link 40, and slot 30g provide several important control features:
1. Spring 42 provides a fail safe feature, since its return force rotates the latches to their enabling positions whether the actuator is selectively deenergized or fails due to malfunction:
2. Spring 42 is effective to rotate the latches to their enabling positions only when the associated valves are inactive;
3. Link 40 allows the use of one actuator for both latches of a disabler pair;
4. Link 40 prevents disablement of the exhaust valve before the intake valve and allows enablement of the exhaust valve before the intake valve, thereby preventing blow-back of hot cylinder gases into the engine manifold; and
5. Slot 30g allows enablement of the exhaust valve before the intake valve, thereby increasing the shifting time available for enabling the disablers. For example, in one particular V-8 engine, the intake and exhaust valves of each valve pair are inactive at the same time for 209 crankshaft degrees and individually inactive for a total of 684 crankshaft degrees; therefore, slot 30g lengthens the enabling shift time by a factor in excess to three.

A clear understanding of how the disablers enable and disable their respective valve is further ascertainable from FIG. 5 and the following description. FIG. 5 is an elevation view of exhaust valve disabler 12 looking in the direction of arrow 5 in FIG. 1; the view includes disabler 12, rocker arm 16, a valve stem 50a of a partially shown poppet valve 50, a spring 52 biasing the valve closed, and a push rod 54. Spring 52 biases valve 50 closed with a force greater than the fulcrum biasing force provided by spring 24 in the disabler. Push rod 54 is actuated by a lobe of an unshown camshaft with a force greater than the biasing force of springs 24 and 52. A hydraulic valve lifter may be included in the drive between the push rod and cam. When a hydraulic lifter is used, the biasing force of spring 24 should be great enough to prevent ballooning of the lifter due to the normal hydraulic force for removing lash.

Valve 50 is enabled for normal opening and closing when latch 30 is in the enabling position, as shown in FIG. 2. When in this position, end stop 30e contacts upturned portion 28b of retainer 28, thereby aligning surfaces 30b of latch 30 with teeth 22c of sleeve 22b and preventing sliding movement of sleeve 22b and fulcrum 22.

Valve 50 is disabled when latch 30 is rotated 45 degrees from the position shown in FIG. 2. When in this position, end stop 30f contacts upturned portion 28b and openings 30c of latch 30 align with teeth 22c, whereby the openings slideably receive the teeth and allow sliding movement of the sleeve and fulcrum in response to movement of the push rod.

The disablers may be made to totally disable or only partially disable the valves by varying the dimension thickness of latch 30 and/or the depth of the spaces 22d. If the dimensions are made great enough, all of the lift from the push rod is absorbed by the sliding movement, thereby totally disabling the valve; when the valve is totally disabled the rocker arm pivots only about its contact point with the valve. If the dimensions are decreased to provide partial valve disablement, the first part of the push rod lift is absorbed by the sliding movement and the other part effects a partial valve opening; when the valve is partially disabled, the rocker arm pivots first about its contact point with the valve and then about the valve disabler fulcrum. Partial valve disablement may be employed in the exhaust valve disabler to replace cylinder gases which leak past the piston rings during compression.

A preferred embodiment of the invention has been disclosed for illustrative purposes. Many variations and modifications of the preferred embodiment are believed to be within the spirit of the invention. The following claims are intended to cover the inventive portions of the preferred embodiment and variations and modifications believed to be within the spirit of the invention.

What is claimed is:

1. An improved means for varying the amount a valve is opened in response to pivotal movement of a rocker arm, said improved means comprising:
   a support member;
   fulcrum means slideably supported by said support member and adapted to provide a pivot surface for the rocker arm;
   sleeve means slideable with said fulcrum means and projecting from said fulcrum means on the side opposite the pivot surface of the fulcrum means;
   means retaining said sleeve means against rotation; and latch means selectively moveable between a valve enabling position preventing sliding movement of said sleeve means and said fulcrum means and a valve disabling position allowing sliding movement of said sleeve means and said fulcrum.

2. The improved means of claim 1, wherein:
said latch means is selectively moveable in a plane normal to the sliding direction of said sleeve means and said fulcrum means.

3. The improved means of claim 1, wherein:
said sleeve means includes a set of spaced teeth slideable therewith; and
said latch means includes a plate moveable between said enabling and disabling positions in a plane normal to the sliding direction of said sleeve means and having a set of abutting surfaces for contacting said teeth and preventing said sliding movement when in said enabling position, and having a set of openings for receiving said teeth and allowing said sliding movement when in said disabling position.

4. The improved means of claim 1, wherein:
said sleeve means includes a set of spaced teeth at the sleeve end opposite said fulcrum means; and
said latch means includes abutting surfaces for contacting said teeth and preventing sliding movement of said sleeve and fulcrum means when said latch is in said enabling position and spaces for receiving said teeth and allowing sliding movement of said sleeve and fulcrum means when said latch is in said disabling position.

5. The improved means of claim 1, wherein said fulcrum means and sleeve means are formed together as a single part.

6. The improved means of claim 1, wherein said latch means includes stop means for limiting movement of said latch between said enabling and disabling positions.

7. The improved means of claim 6 wherein said latch is rotatably moveable and said stop means limits said rotatable movement to 45 degrees.

8. The improved means of claim 1, wherein:
said latch means is supported for rotational movement by said support means and in a plane normal to the sliding movement of said sleeve means.

9. The improved means of claim 8, wherein:
said sleeve means includes a set of circumferentially spaced teeth projecting axially from said sleeve at the sleeve end opposite said fulcrum means; and
said latch means includes a set of circularly arrayed abutting surfaces operative to abut said teeth for preventing sliding movement of said sleeve when said latch is in said enabling position and a set of openings spacing said abutting surfaces apart and operative to slideably receive said teeth for allowing sliding movement of said sleeve when said latch is in said disabling position.

10. The improved means of claim 9, wherein:
said latch means includes stop means for limiting rotational movement of said latch between said enabling and disabling positions.

11. The improved means of claim 8, wherein said retainer means is supported by said support member and includes means slideably received by one of the spaces between said teeth for preventing said rotational movement of said sleeve.

12. An improved means for varying the amount a valve is opened in response to pivotal movement of a rocker arm, said improved means comprising:
a support member;
fulcrum means slideably supported by said support member and adapted to provide a pivot surface for the rocker arm;
means for biasing the pivot surface of said fulcrum means against said rocker arm;
sleeve means slideable with said fulcrum means and projecting from said fulcrum on the side opposite said pivot surface;
retainer means operative to prevent rotation of said sleeve means; and
latch means moveable between a valve enabling position preventing sliding movement of said sleeve and fulcrum means and a valve disabling position allowing sliding movement of said fulcrum and sleeve.

13. The improved means of claim 12, wherein:
said latch means is supported for rotational movement by said support means and in a plane normal to the sliding movement of said sleeve means.

14. The improved means of claim 13, wherein:
said sleeve means includes a set of circumferentially spaced teeth projecting axially from said sleeve at the sleeve end opposite said fulcrum means; and
said latch means includes a set of circularly arrayed abutting surfaces operative to abut said teeth for preventing sliding movement of said sleeve when said latch is in said enabling position and a set of openings spacing said abutting surfaces apart and operative to slideably receive said teeth for allowing sliding movement of said sleeve when said latch is in said disabling position.

15. The improved means of claim 14, wherein:
said latch means includes stop means for limiting rotational movement of said latch between said enabling and disabling positions.

16. The improved means of claim 13, wherein said retainer means is supported by said support member and includes means slideably received by one of the spaces between said teeth for preventing said rotational movement of said sleeve.

17. An improved means for varying the amount an engine valve is opened in response to pivotal movement of a rocker arm, said improved means comprising:
an elongated support member adapted to be attached to the engine at one end and adapted to extend through an opening in the pivot portion of the rocker arm;
fulcrum means slideably disposed about said support member and adapted to present a curved surface to the pivot portion of said rocker arm;
spring means concentrically surrounding said support member and adapted to bias said fulcrum means against said rocker arm;
stop means for limiting sliding movement of the fulcrum means in the biased direction;
sleeve means slideable with said fulcrum means and extending from said fulcrum means in concentric surrounding relating to said support member and spring means, said sleeve means having a set of circumferentially spaced teeth at the sleeve end opposite said fulcrum means;
retainer means for preventing rotational movement of said sleeve relative to said support member; and
latch means supported by said support member for movement between a valve enabling position and a valve disabling position in a plane normal to said sliding movement, said latch means having a set of abutting surfaces for contacting said teeth and preventing said sliding movement when in said enabling position and having a set of spaces for slideably receiving said teeth and allowing said sliding movement when in said disabling position.

18. In an internal combustion engine having improved means varying the amount of valve opening in a valve actuating drivetrain of the type including a rocker arm having an opening extending therethrough, a valve biased to the closed position by a spring force and operatively associated with one end of the rocker arm and normally moved a predetermined opening distance in response to a drive means applying a force which moves the other end of the rocker arm a given distance, said improved means comprising:

a support member attached to the engine at one end and extending through the opening in said rocker arm;

fulcrum means slideably supported by said support member and providing a pivot surface for said rocker arm;

means biasing said pivot surface against said rocker arm with a resilient force inferior to the forces of said spring and drive means;

sleeve means slideable with said fulcrum means and projecting from said fulcrum means on the side opposite said pivot surface;

retainer means operative to prevent rotation of said sleeve means; and latch means moveable between a valve enabling position preventing sliding movement of said sleeve and fulcrum means, and a valve disabling position allowing sliding movement of said sleeve and fulcrum means.

19. The improved means of claim 18, wherein:
said latch means is selectively moveable in a plane normal to the sliding direction of said sleeve means and said fulcrum means.

20. The improved means of claim 18, wherein:
said sleeve means includes a set of spaced teeth slideable therewith; and
said latch means includes a plate moveable between said enabling and disabling positions in a plane normal to the sliding direction of said sleeve means and having a set of abutting surfaces for contacting said teeth and preventing said sliding movement when in said enabling position, and having a set of openings for receiving said teeth and allowing said sliding movement when in said disabling position.

21. The improved means of claim 18, wherein:
said sleeve means includes a set of spaced teeth at the sleeve end opposite said fulcrum means; and
said latch means includes abutting surfaces for contacting said teeth and preventing sliding movement of said sleeve and fulcrum means when said latch is in said enabling position and spaces for receiving said teeth and allowing sliding movement of said sleeve and fulcrum means when said latch is in said disabling position.

22. The improved means of claim 18, wherein said fulcrum means and sleeve means are formed together as a single part.

23. The improved means of claim 18, wherein said latch means includes stop means for limiting movement of said latch between said enabling and disabling positions.

24. The improved means of claim 23 wherein said latch is rotatably moveable and said stop means limits said rotatable movement to 45 degrees.

25. The improved means of claim 18, wherein:
said latch means is supported for rotational movement by said support means and in a plane normal to the sliding movement of said sleeve means.

26. The improved means of claim 25, wherein:
said sleeve means includes a set of circumferentially spaced teeth projecting axially from said sleeve at the sleeve end opposite said fulcrum means; and
said latch means includes a set of circularly arrayed abutting surfaces operative to abut said teeth for preventing sliding movement of said sleeve when said latch is in said enabling position and a set of openings spacing said abutting surfaces apart and operative to slideably receive said teeth for allowing sliding movement of said sleeve when said latch is in said disabling position.

27. The improved means of claim 26, wherein:
said latch means includes stop means for limiting rotational movement of said latch between said enabling and disabling positions.

28. The improved means of claim 25, wherein said retainer means is supported by said support member and includes means slideably received by one of the spaces between said teeth for preventing said rotational movement of said sleeve.

29. In an internal combustion engine having improved means varying the amount of valve opening in a valve actuating drivetrain of the type including a rocker arm having an opening extending therethrough, a valve biased to the closed position by a spring force and operatively associated with one end of the rocker arm and normally moved a predetermined opening distance in response to a drive means applying a force which moves the other end of the rocker arm a given distance, said improved means comprising:

an elongated support member attached to the engine at one end and extending through the opening in said rocker arm;

fulcrum means slideably disposed about said support member and providing a pivot surface for said rocker arm;

spring means concentrically surrounding said support member and biasing said pivot surface against said rocker arm with a force inferior to the forces of said valve spring and drive means;

sleeve means slideable with said fulcrum means and extending from said fulcrum means in concentric surrounding relation to said support member and spring means, said sleeve means having a set of circumferentially spaced teeth at the sleeve end opposite said fulcrum means;

retainer means for preventing rotational movement of said sleeve relative to said support member; and latch means supported by said support member for movement between a valve enabling position and valve disabling position in a plane normal to said sliding movement, said latch means having a set of abutting surfaces for contacting said teeth and preventing said sliding movement when in said enabling position and having a set of spaces for slideably receiving said teeth and allowing said sliding movement when in said disabling position.

* * * * *